UNITED STATES PATENT OFFICE.

LOUIS M. DENNIS, OF ITHACA, NEW YORK.

METHOD OF SEPARATING A SULFONIC ACID OF A HYDROCARBON OF THE AROMATIC SERIES FROM SULFURIC ACID AND OF CONVERTING THE SULFONIC ACID INTO A SALT.

1,229,593.

Specification of Letters Patent.

Patented June 12, 1917.

No Drawing. Original application filed December 18, 1915, Serial No. 67,535. Divided and this application filed November 6, 1916. Serial No. 129,658.

*To all whom it may concern:*

Be it known that I, LOUIS M. DENNIS, a citizen of the United States of America, residing at Ithaca, Tompkins county, New York, have invented certain new and useful improvements in methods of separating a sulfonic acid of a hydrocarbon of the aromatic series from sulfuric acid and of converting the sulfonic acid into a salt, of which the following is a specification.

My invention relates to methods of separating a sulfonic acid of a hydrocarbon of the aromatic series from sulfuric acid and of converting the sulfonic acid into a salt, and has as its object the shortening of time, lessening in labor and saving of material in carrying out said method and the consequent resulting economies in cost production.

In my application Serial No. 67,535, filed December 18, 1915, of which this is a division, I have described and claimed one of the ways by which my process may be carried out. In this I shall claim another way.

I shall illustrate my invention by describing the making of sodium benzene sulfonate although the invention is not restricted to the making of such salt alone.

It has been the general commercial practice in making salts of benzene sulfonic acid, specifically sodium benzene sulfonate, to treat benzene with fuming sulfuric acid to produce benzene sulfonic acid in the presence of an excess of sulfuric acid; this mixture is then usually treated with lime and a sodium compound, which forms chiefly calcium sulfate and sodium benzene sulfonate; these two salts are then separated by treatment with water which dissolves the sodium benzene sulfonate with a little of the calcium sulfate, and the solid is then separated from the solution by filtration. This method of separation of the two salts is, however, not sharp, and to avoid large loss it is usually necessary to repeatedly wash the calcium sulfate with water to remove the sodium benzene sulfonate, filtering off the solution of the sodium salt after each such washing. The separation may of course be completed by repeated washing but this is uneconomical. The dilute solution of sodium benzene sulfonate must then be evaporated to dryness. It will be observed that the excess of sulfuric acid which has not reacted with the benzene is converted into the comparatively valueless calcium sulfate and thus lost.

By my method, I avoid the use of lime and consequent production of calcium sulfate; I avoid the consequent necessary separation by filtration; I avoid the evaporation of dilute solution and recover the excess of sulfuric acid which has not reacted with the benzene.

In carrying out my process I treat the mixture of benzene sulfonic acid and sulfuric acid, formed as above stated, with benzene which dissolves the benzene sulfonic acid but not the sulfuric acid. The solution of benzene sulfonic acid in benzene, which separates from the residual sulfuric acid in a distinct layer is then treated with water which dissolves out the sulfonic acid from the benzene. The resulting water solution is then neutralized by being brought into contact with a suitable base or compound, such as an aqueous solution of sodium hydroxid, and the salt is separated out by evaporation of the water.

The benzene thus set free may be used again in the extraction of further portions of benzene sulfonic acid from a fresh mixture of the same with sulfuric acid. The sulfuric acid which remains after the benzene sulfonic acid has been removed from it by the benzene is drawn off and used for any desired purpose.

It is obvious that other solvents than benzene may be used to dissolve the sulfonic acid and that other salts than the sodium salt of said acid may be produced by the use of suitable bases or other compounds.

I claim:

1. A method of separating a sulfonic acid of a hyrocarbon of the aromatic series from sulfuric acid consisting in treating a mixture of the acids with a solvent which is relatively insoluble in water and in which sulfuric acid is relatively insoluble, separating the solution of sulfonic acid in the solvent from sulfuric acid and substantially freeing the solvent from the sulfonic acid by treating the same with water to dissolve and retain the sulfonic acid.

2. A method of separating a sulfonic acid of a hydrocarbon of the aromatic series from sulfuric acid consisting in treating a mixture of the acids with an organic solvent which is relatively insoluble in water and in which sulfuric acid is relatively insoluble, separating the solution of sulfonic acid in the organic solvent from sulfuric acid and substantially freeing the solvent from the sulfonic acid by treating the same with water to dissolve and retain the sulfonic acid.

3. A method of separating a sulfonic acid of a hydrocarbon of the aromatic series from sulfuric acid consisting in treating a mixture of the acids with benzene, separating the benzene solution of sulfonic acid from the sulfuric acid and substantially freeing the benzene from the sulfonic acid by treating the same with water to dissolve and retain the sulfonic acid.

4. A method of separating benzene sulfonic acid from sulfuric acid consisting in treating a mixture of the acids with benzene, separating the benzene solution of benzene sulfonic acid from the sulfuric acid and substantially freeing the benzene from the benzene sulfonic acid by treating the same with water to dissolve and retain the sulfonic acid.

5. A method of making a salt of a sulfonic acid of a hydrocarbon of the aromatic series consisting in treating a mixture of the sulfonic acid and sulfuric acid with a solvent which is relatively insoluble in water and in which the sulfuric acid is relatively insoluble, separating the solution of sulfonic acid in the solvent from sulfuric acid, treating the solution with water to dissolve and retain the sulfonic acid and treating said aqueous solution with a suitable compound capable of reacting on the sulfonic acid in aqueous solution to form a salt.

6. A method of making a salt of a sulfonic acid of a hydrocarbon of the aromatic series consisting in treating a mixture of the sulfonic acid and sulfuric acid with an organic solvent which is relatively insoluble in water and in which the sulfuric acid is relatively insoluble, separating the solution of sulfonic acid in the organic solvent from sulfuric acid, treating the solution with water to dissolve and retain the sulfonic acid and treating said aqueous solution with a suitable compound capable of reacting on the sulfonic acid in aqueous solution to form a salt.

7. A method of making a salt of a sulfonic acid of a hydrocarbon of the aromatic series consisting in treating a mixture of the sulfonic acid and sulfuric acid with benzene, separating the benzene solution of sulfonic acid from sulfuric acid, treating the solution with water to dissolve and retain the sulfonic acid and treating the said aqueous solution with a suitable compound capable of reacting on the sulfonic acid in aqueous solution to form a salt.

8. A method of making the sodium salt of a sulfonic acid of a hydrocarbon of the aromatic series consisting in treating a mixture of the sulfonic acid and sulfuric acid with benzene, separating the benzene solution of sulfonic acid from sulfuric acid, treating the solution with water to dissolve and retain the sulfonic acid and treating said aqueous solution with a suitable sodium compound capable of reacting on the sulfonic acid in aqueous solution to form its sodium salt.

9. A method of making the sodium salt of a sulfonic acid of a hydrocarbon of the aromatic series consisting in treating a mixture of the sulfonic acid and sulfuric acid with benzene, separating the benzene solution of sulfonic acid from sulfuric acid, treating the solution with water to dissolve and retain the sulfonic acid and treating said aqueous solution with sodium hydroxid.

10. A method of making a salt of benzene sulfonic acid consisting in treating a mixture of the sulfonic acid and sulfuric acid with a solvent which is relatively insoluble in water and in which sulfuric acid is relatively insoluble, separating the solution of benzene sulfonic acid in the solvent from sulfuric acid, treating the solution with water to dissolve and retain the sulfonic acid and treating said aqueous solution with a suitable compound capable of reacting on the sulfonic acid in aqueous solution to form a salt.

11. A method of making a salt of benzene sulfonic acid consisting in treating a mixture of the sulfonic acid and sulfuric acid with an organic solvent which is relatively insoluble in water and in which sulfuric acid is relatively insoluble, separating the solution of benzene sulfonic acid in the organic solvent from sulfuric acid, treating the solution with water to dissolve and retain the sulfonic acid and treating said aqueous solution with a suitable compound capable of reacting on the sulfonic acid in aqueous solution to form a salt.

12. A method of making a salt of benzene sulfonic acid consisting in treating a mixture of the sulfonic acid and sulfuric acid with benzene, separating the benzene solution of benzene sulfonic acid from sulfuric acid, treating the solution with water to dissolve and retain the sulfonic acid and treating said aqueous solution with a suitable compound capable of reacting on the sulfonic acid in aqueous solution to form a salt.

13. A method of making sodium benzene sulfonate consisting in treating a mixture of benzene sulfonic acid and sulfuric acid with benzene, separating the benzene solution of benzene sulfonic acid from sulfuric acid, treating the solution with water to dissolve and retain the sulfonic acid and treating said aqueous solution with a suitable sodium compound capable of reacting on the sulfonic acid in aqueous solution to form its sodium salt.

14. A method of making a sodium benzene sulfonate consisting in treating a mixture of benzene sulfonic acid and sulfuric acid with benzene, separating the benzene solution of benzene sulfonic acid from sulfuric acid, treating the solution with water to dissolve and retain the sulfonic acid and treating said aqueous solution with sodium hydroxid.

In testimony whereof I have signed this specification.

LOUIS M. DENNIS.